US009048042B2

(12) United States Patent
Steuer et al.

(10) Patent No.: US 9,048,042 B2
(45) Date of Patent: Jun. 2, 2015

(54) DOMED METAL SWITCH HAVING A FLANGE WITH AN ACTUATION PROTRUSION

(71) Applicant: Google Technology Holdings LLC, Mountain View, CA (US)

(72) Inventors: Paul R. Steuer, Hawthorn Woods, IL (US); Rachid M. Alameh, Crystal Lake, IL (US); Patrick J. Cauwels, South Beloit, IL (US); David P. Winkler, Palatine, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 184 days.

(21) Appl. No.: 13/710,588

(22) Filed: Dec. 11, 2012

(65) Prior Publication Data

US 2014/0162482 A1    Jun. 12, 2014

(51) Int. Cl.
    *H01R 13/52*     (2006.01)
    *H01H 13/06*     (2006.01)
    *H01H 9/04*      (2006.01)
    *H01R 13/24*     (2006.01)

(52) U.S. Cl.
    CPC ......... *H01H 13/063* (2013.01); *H01R 13/5202* (2013.01); *H01H 9/04* (2013.01); *H01H 2009/048* (2013.01); *H01R 13/2478* (2013.01); *H01R 13/2485* (2013.01); *H01R 13/521* (2013.01)

(58) Field of Classification Search
    USPC .......................................... 439/271–275, 587
    See application file for complete search history.

(56) References Cited

U.S. PATENT DOCUMENTS

| 3,218,605 | A * | 11/1965 | Wanlass ........................ 439/749 |
| 6,844,508 | B2 | 1/2005 | Lim |
| 7,448,914 | B2 | 11/2008 | Calvas et al. |
| 7,557,320 | B1 * | 7/2009 | Crooijmans et al. .......... 200/406 |
| 7,959,454 | B2 | 6/2011 | Ramasubramanian et al. |
| 7,967,959 | B2 * | 6/2011 | Howard et al. .......... 204/196.18 |
| 7,972,166 | B2 | 7/2011 | Hiner et al. |
| 8,282,566 | B2 * | 10/2012 | Mauge et al. ................. 600/488 |
| 2008/0251369 | A1 * | 10/2008 | Villain et al. ................. 200/534 |
| 2009/0281528 | A1 * | 11/2009 | Grovender et al. ........ 604/892.1 |
| 2010/0121991 | A1 * | 5/2010 | Kim ................................. 710/16 |
| 2013/0139605 | A1 * | 6/2013 | Burke et al. .................... 73/768 |

FOREIGN PATENT DOCUMENTS

| EP | 1983534 A2 | 10/2008 |
| EP | 2184908 A1 | 5/2010 |

OTHER PUBLICATIONS

Patent Cooperation Treaty, International Search Report and Written Opinion of the International Searching Authority for International Application No. PCT/US2013/071841, Mar. 5, 2014, 9 pages.

* cited by examiner

*Primary Examiner* — Chandrika Prasad

(57) ABSTRACT

A connector (100) and connector system are provided. A connector can include a domed metal switch (102) that is partially covered with a liquid impermeable barrier (101) such that a portion of the domed metal switch is exposed and the liquid impermeable barrier is coupled to the domed metal switch with a liquid impermeable junction (221). In a connector system, a complementary connector can include a dome switch actuator (706,707), partially covered with another liquid impermeable barrier. When pressed against the connector, the domed metal switch can deform to contact an electrical conductor (104). A control circuit (1309) can determine whether an electronic device or user is causing the deformation by detecting whether voltage or current is applied to the domed metal switch while deformed.

15 Claims, 13 Drawing Sheets

DOMED METAL SWITCH HAVING A FLANGE WITH AN ACTUATION PROTRUSION

BACKGROUND

1. Technical Field

This invention relates generally to electrical connectors, and more particularly to electrical connectors for electronic devices.

2. Background Art

Electrical connectors are used to couple electronic devices together. For example, many electrical devices use plug and socket type connectors to deliver power or data between the devices.

A problem with prior art connectors is that they may not provide an adequate electrical connection in all environments. It would be advantageous to have a more robust electrical connector.

Figure 1:
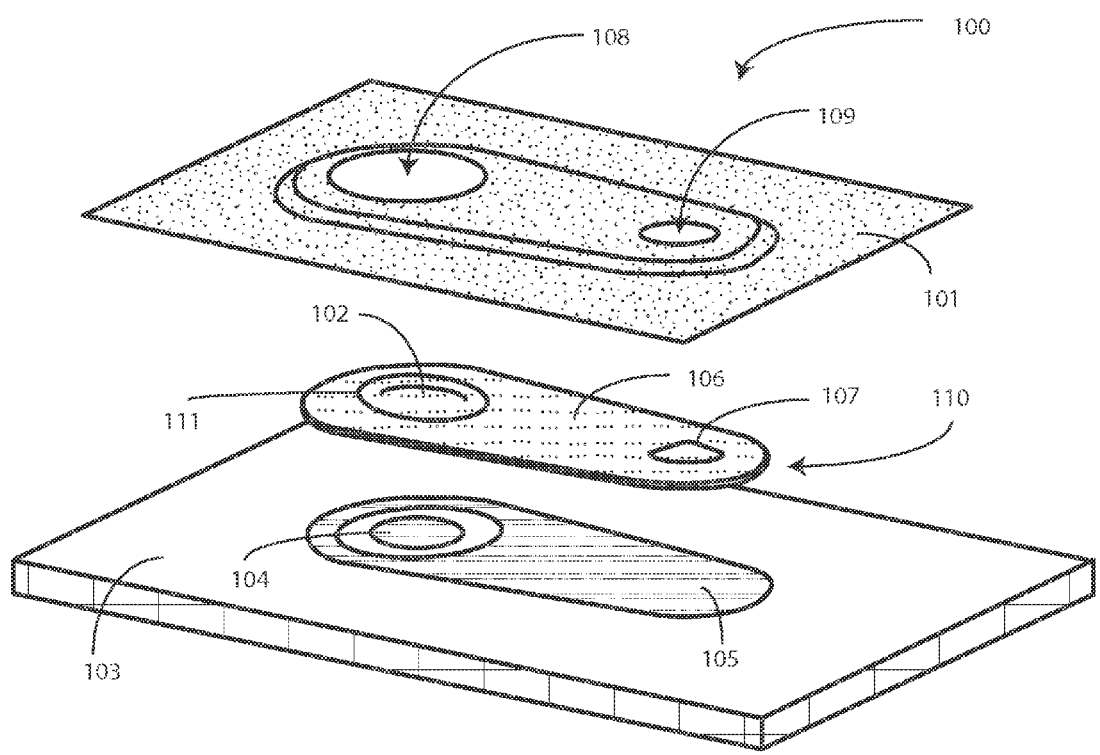
FIG. 1 illustrates an exploded view of one explanatory electrical connector configured in accordance with one or more embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Before describing in detail embodiments that are in accordance with the present invention, it should be observed that the embodiments reside primarily in combinations of method steps and apparatus components related to use of one or more electrical connectors configured in accordance with one or more embodiments of the invention. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of using the electrical connectors described below. The non-processor circuits may include, but are not limited to, a control circuit, signal drivers, clock circuits, power source circuits, and mechanically compliant devices. As such, these functions may be interpreted as steps of a method to perform using the connectors described below.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

One problem with prior art electrical connectors is that it is difficult to create a reliable electrical connection between two waterproof devices. For example, a diver who wears a waterproof watch that tracks data from a dive would have difficulty connecting the watch to a data storage device while in the water due to the absence of electrical connectors capable of providing a reliable electrical connection between the devices without compromising the waterproof nature of those devices. Generally speaking, adding an external connector to either device, which requires electrical contacts passing through holes, causes the device to no longer be sufficiently waterproof.

Embodiments of the present invention solve this problem by providing electrical connector configurations suitable for reliably electrically connecting two waterproof devices without compromising the waterproof nature of either device, as well as preserving the waterproof nature of the combined device assembly. In one embodiment, this is done by providing an electrical connector that includes a domed metal switch that is partially covered with a liquid impermeable barrier such that at least a portion of the domed metal switch is exposed. The liquid impermeable barrier, which can be a thin layer of film or other material, is coupled to the domed metal switch with a liquid impermeable junction, such as a weld or adhesive seal.

When two complementary connectors are pressed together, the domed metal switch is configured to deform, thereby connecting electrical circuits disposed beneath the liquid impermeable barrier. In effect, an electrical connection is made on the interior or "waterproof" side of the domed metal switch and the liquid impermeable barrier. Accordingly, the circuitry to which the electrical connection is operable remains watertight. Where the complementary connector causing the domed metal switch to deform is electrically conductive, power, data, and other electrical signals can be delivered through the electrically conductive dome switch actuator and the domed metal switch to the electrical connection. Accordingly, a waterproof charger can be coupled to a waterproof wearable device to charge a battery disposed within the wearable device. When the complementary connectors are pressed together, the charger, wearable device, and combined system all remain water impermeable.

Turning now to FIG. 1, illustrated therein is one embodiment of a connector 100 configured in accordance with one or more embodiments of the invention. The connector 100 is shown in exploded view such that the various components may be more readily seen.

The illustrative connector 100 of FIG. 1 includes a liquid impermeable barrier 101, a domed metal switch 102, and a substrate 103. In this explanatory embodiment, a flange 106 extends from the domed metal switch 102. Additionally, an actuation protrusion 107 extends upward from the flange 106 on a distal end of the flange 106 relative to the domed metal switch. Disposed beneath the domed metal switch 102, the flange 106, and the actuation protrusion 107 are a first electrical conductor 104 and a second electrical conductor 105. The first electrical conductor 104 and the second electrical conductor 105 are disposed on the substrate 103.

In one embodiment, the domed metal switch 102, flange 106, and actuation protrusion 107 are formed from a unitary piece of electrically conductive material. For example, in one embodiment these three components can be manufactured from a single piece of spring steel. Other electrically conductive materials will be obvious to those of ordinary skill in the art having the benefit of this disclosure. For discussion purposes, the domed metal switch 102, flange 106, and actuation protrusion 107 will be collectively referred to as the switch element 110.

When the switch element 110 is connected to the substrate 103, the flange 106, actuation protrusion 107, and at least some of a perimeter 111 of the domed metal switch 102 will be electrically coupled to the second electrical conductor 105. The first electrical conductor 104 will be electrically isolated from all parts of the switch element 110. As will be shown later, this electrical isolation will be broken when the domed metal switch 102 is actuated by deformation. However, initially, when in the unactuated state, an air gap will provide electrical isolation between the domed metal switch 102 and the first electrical conductor 104.

The substrate 103 can be manufactured from a variety of materials. In one embodiment, the substrate 103 will comprise a printed circuit board, such as an FR4 material. This permits the first electrical conductor 104 and the second electrical conductor 105 to be formed by depositing exposed electrical traces along the printed circuit board. Using a printed circuit board as the substrate 103 is not a requirement, however, as other devices or materials can be used as the substrate in other applications. For example, in another embodiment, the substrate 103 may be the exterior housing of an electronic device. In still other embodiments, the substrate 103 may be flexible, such as a flexible circuit substrate. Such an embodiment may be suitable when the connector 100 is being integrated into a flexible dongle extending from an electrical device. Other substrate materials will be obvious to those of ordinary skill in the art having the benefit of this disclosure.

The liquid impermeable barrier 101 can likewise be formed from a variety of materials. The illustrative liquid impermeable barrier 101 of FIG. 1 is formed from a layer of thin film, such as a polyethylene film or polyimide film. In another embodiment, the liquid impermeable barrier 101 can be formed from a rubberized layer, either by using a rubberized film or by depositing a rubber coating atop the connector 100. In other embodiments, the liquid impermeable barrier 101 can be formed from a resin or plasticized layer. Other materials will be obvious to those of ordinary skill in the art having the benefit of this disclosure.

The liquid impermeable barrier 101 defines at least one aperture 108 such that when the liquid impermeable barrier 101 is placed atop the switch element 110, the domed metal switch 102 is only partially covered by the liquid impermeable barrier 101 such that at least a portion of the domed metal switch 102 is exposed through the liquid impermeable barrier 101. In this illustrative embodiment, the liquid impermeable barrier 101 defines a pair of apertures 108,109, with one aperture 108 corresponding to the domed metal switch 102 and another aperture 109 corresponding to the actuation protrusion 107. Accordingly, when the liquid impermeable barrier 101 is placed atop the switch element 110, both the domed metal switch 102 and the actuation protrusion 107 will be only partially covered such that at least a portion of each device will be exposed through the liquid impermeable barrier 101.

In one embodiment, the liquid impermeable barrier 101 is coupled to the domed metal switch 102 with a liquid impermeable junction. The liquid impermeable junction can be formed by applying a liquid impermeable adhesive between the liquid impermeable barrier 101 and the domed metal switch in one embodiment. Other methods can also be used. For example, where the domed metal switch 102 is integrated with a plastic layer by insert molding, the liquid impermeable barrier 101 may be thermally or sonically welded to the plastic portion of the switch element. Where the liquid impermeable barrier 101 is deposited atop the switch element, the liquid impermeable junction may be formed when the liquid impermeable barrier 101 solidifies against the switch element 110. Other methods of forming the liquid impermeable junction will be obvious to those of ordinary skill in the art having the benefit of this disclosure.

Figure 2:
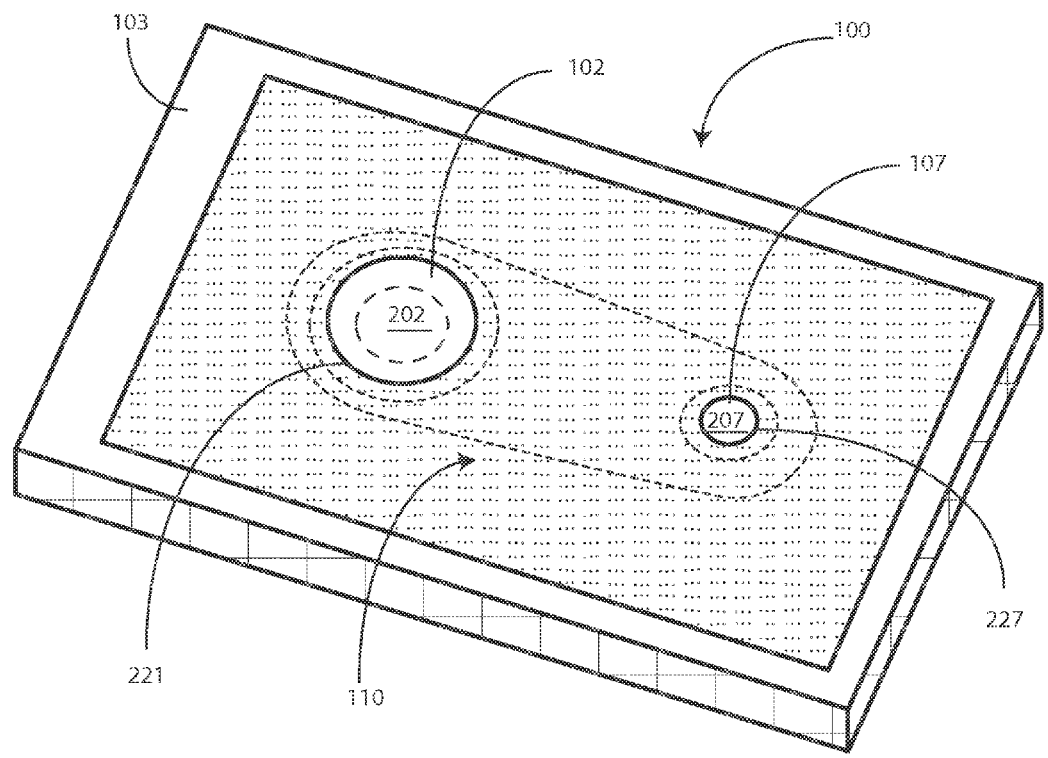
FIG. 2 illustrates a perspective view of one explanatory electrical connector configured in accordance with one or more embodiments of the invention.

Turning now to FIG. 2, illustrated therein is a perspective view of the connector 100 of FIG. 1 after assembly. As shown, the domed metal switch 102 is partially covered with the liquid impermeable barrier 101 such that only a portion 202 of the domed metal switch 102 is exposed on a side of the liquid impermeable barrier 101 opposite the substrate 103. An apex 207 of the actuation protrusion 107 is likewise exposed through the liquid impermeable barrier 101. Liquid impermeable junctions 222,227 have been formed between the domed metal switch 102 and the actuation protrusion 107 and the liquid impermeable barrier 101 by using a liquid impermeable adhesive between the metal of the switch element 110 and the liquid impermeable barrier 101 at the intersections.

Figure 3:
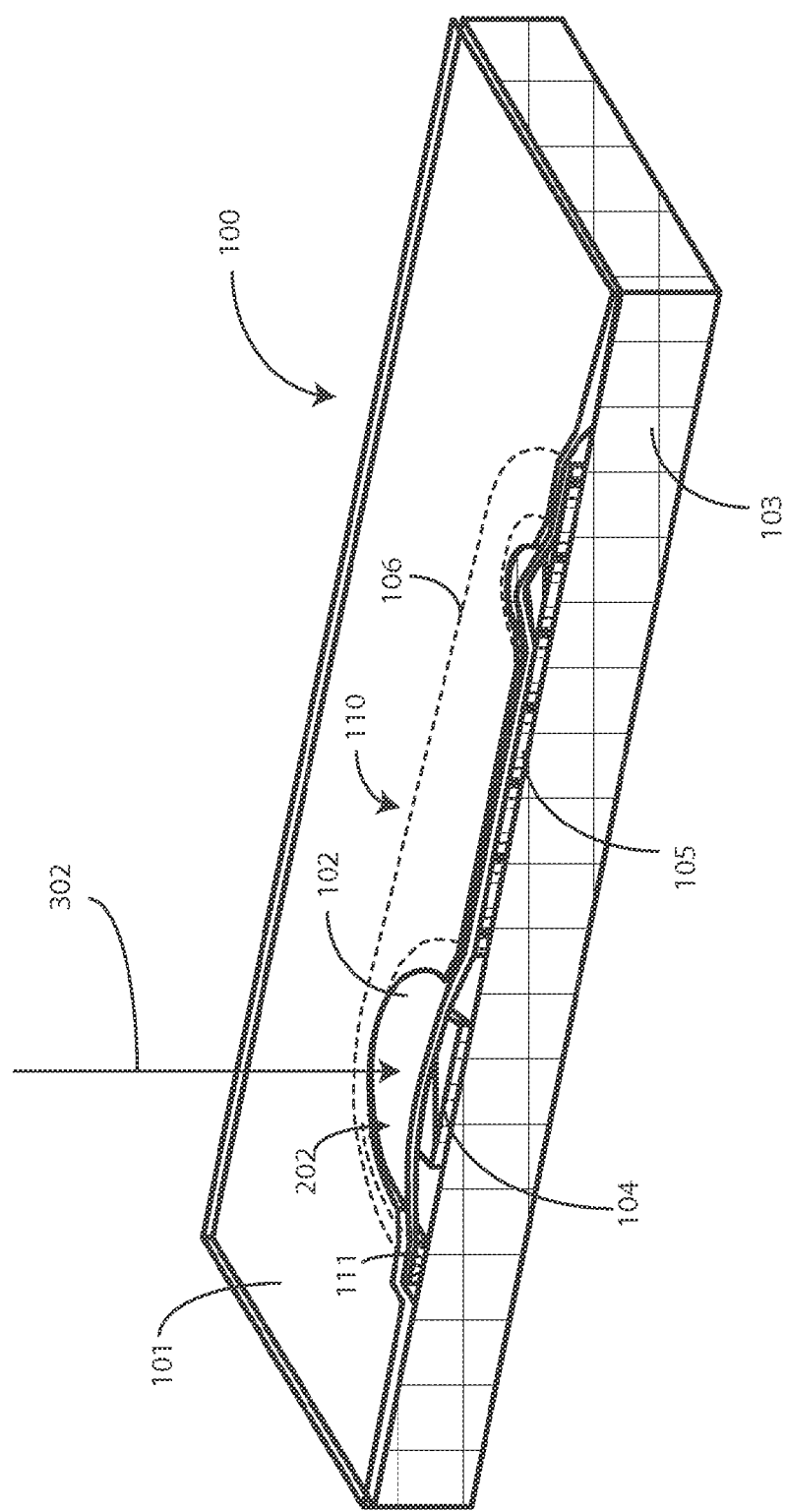
FIG. 3 illustrates a sectional view of one explanatory electrical connector configured in accordance with one or more embodiments of the invention.

Turning now to FIG. 3, illustrated therein is a sectional view of the connector 100 after assembly. As shown, the first electrical conductor 104 is disposed beneath the domed metal switch 102, with an air gap therebetween providing electrical isolation between the two. The second electrical conductor 105 is disposed beneath the flange 106 and the liquid impermeable barrier 101. The flange 106, the actuation protrusion, and at least some of the perimeter 111 of the domed metal switch 102 are each electrically coupled to the second electrical conductor 105 in this illustrative embodiment. As both the first electrical conductor 104 and the second electrical conductor 105 are disposed beneath the switch element 110 and the liquid impermeable barrier 101, a waterproof seal is formed above these conductors. In this illustrative embodiment, both the first electrical conductor 104 and the second electrical conductor 105 are electrical traces that are disposed upon the substrate 103, which is a rigid printed circuit board.

In one embodiment, the domed metal switch 102 is configured to deform in response to an applied force 302. When sufficient force is applied, the domed metal switch 102 will deform by an amount sufficient to touch the first electrical conductor 104, thereby creating an electrically conductive path between the second electrical conductor 105 and the first electrical conductor 104 through the domed metal switch 102. Accordingly, the connector can be used as a user input device in one or more embodiments. By applying a control signal to the second electrical conductor 105, this control signal will be delivered to the first electrical conductor 104 when a user presses the domed metal switch 102 with enough applied force 302 to cause the domed metal switch 102 to touch the first electrical conductor 104.

In other embodiments, since a portion 202 of the domed metal switch 102 is exposed, the connector 100 can also be used as an electronic device interface. When an electrically conductive element provides the applied force 302, electrical voltage and/or current signals can be delivered through the domed metal switch 102 to the first electrical conductor 104, the second electrical conductor 105 or combinations thereof. Accordingly, one significant advantage of embodiments of the present invention is that they serve a dual function: user input device and electronic device input. By determining whether a voltage or current is applied to the domed metal switch 102 when deformed, a control circuit operable with the switch element 110 can differentiate between a person providing the applied force 302 and another electronic device providing the applied force 302. The control circuit can then be configured to execute different operations based upon this differentiation capability.

Figure 4:
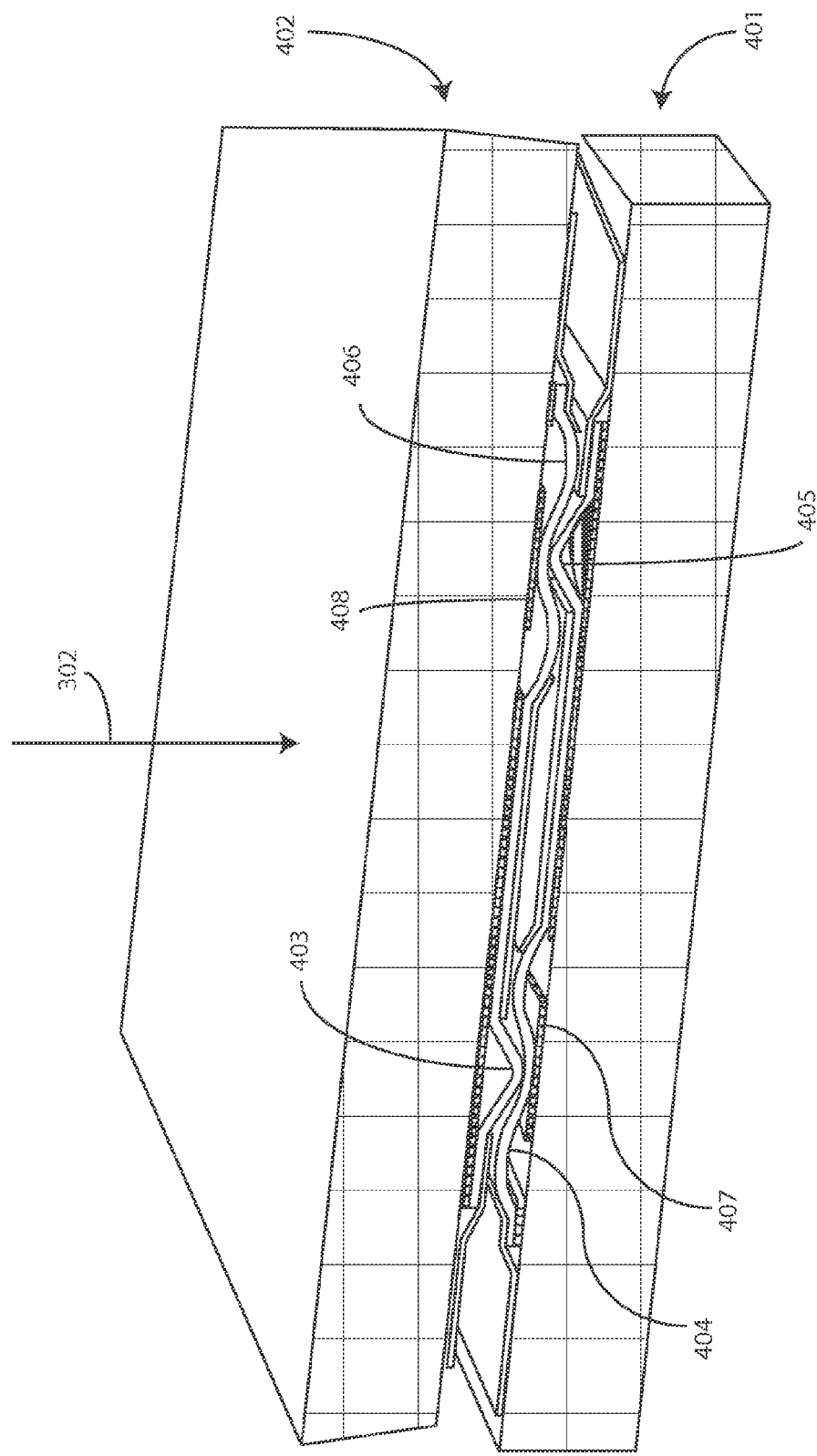
FIG. 4 illustrates one explanatory connector system configured in accordance with one or more embodiments of the invention.

Turning now to FIG. 4, illustrated therein is a connector system 400 configured in accordance with one or more embodiments of the invention. A first connector portion 401 is being pressed against a complementary second connector portion 402 by an applied force 302. Each of the first connector portion 401 and the second connector portion 402 is configured like the connector (100) described above, and includes a domed metal switch (102) that is partially covered with a liquid impermeable barrier (101) such that a portion of the domed metal switch (102) is exposed. Further, each connector portion 401,402 includes a flange (106) and an actuation protrusion (107) having an apex (207) exposed through the liquid impermeable barrier (101).

The connector portions 401,402 are "complementary" because each is rotated 180 degrees out of phase with the other. Accordingly, the domed metal switch of the first connector portion 401 aligns with the actuation protrusion of the second connector portion 402. In this configuration, the actuation protrusions of each connector portion function as a dome switch actuator with the vertex thereof serving as an actuation element configured to deform the corresponding domed metal switch when the connector portions 401,402 are aligned such that an actuation element is placed against an exposed portion of a domed metal switch and the connector portions 401,402 are pressed together. For example, as shown in FIG. 4, a first actuation element 403 of the second connector portion 402 deforms a first domed metal switch 404 in response to the applied force 302. Similarly, a second actuation element 405 of the second connector portion 402 deforms a second domed metal switch 406 in response to the applied force 302. When this occurs, the domed metal switches 404,406 deform sufficiently to contact the electrical conductors 407,408 disposed beneath their domes. This facilitates an electrical connection between the electrical conductors 407,408 through the domed metal switches 404,406, thereby providing an electrical connection without compromising the waterproof integrity of either connector portion 401,402. Accordingly, where the first connector portion 401 is integrated with a diving watch, and second connector portion 402 is integrated with a charger, the charger could charge the watch while both devices remain waterproof. Moreover, when the applied force 302 makes the connection between the two devices, the combination of devices is also waterproof.

Figure 5:
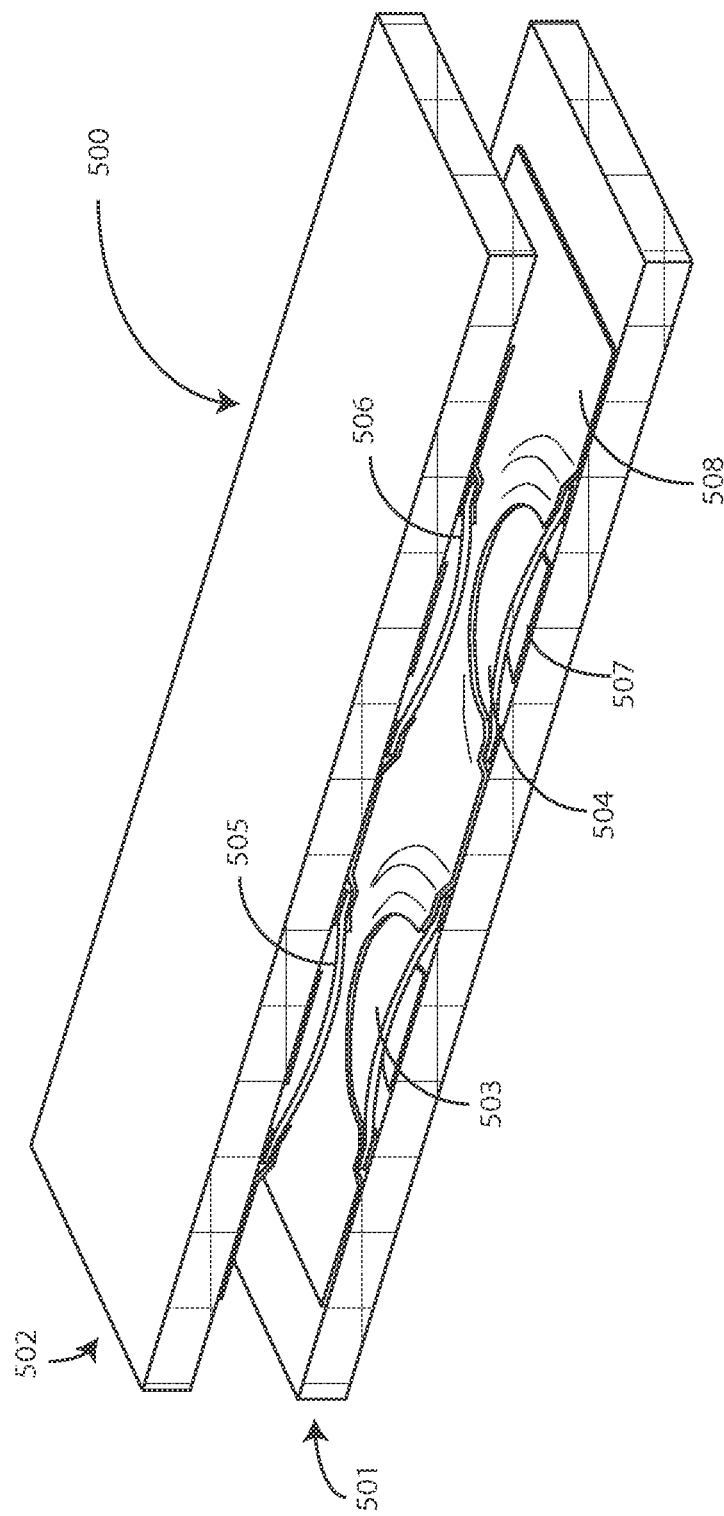
FIG. 5 illustrates another explanatory electrical connector system, in an unengaged state, configured in accordance with one or more embodiments of the invention.

The actuation element to this point has been illustrated as an actuation protrusion having an apex. However, it should be understood that embodiments of the invention are not so limited. To be sure, the actuation element can take various forms. Turning now to FIG. 5, illustrated therein is an alternate connector system 500 where the actuation element is configured as another domed metal switch.

In FIG. 5, a first connector portion 501 and a second connector portion 502 are shown. Rather than using an actuation protrusion to deform a corresponding domed metal switch, in FIG. 5 the domed switch elements are also domed metal switches. Accordingly, the first connector portion 501 includes two domed metal switches 503,504. Similarly, the second connector portion 502 includes two domed metal switches 505,506. Each of these domed metal switches is covered by a liquid impermeable layer such that only a portion thereof is exposed through the liquid impermeable layer.

In this illustrative embodiment, the domed metal switches of each connector portion are electrically coupled by a flange. Accordingly, domed metal switches 503,504 are electrically coupled by a flange, as are domed metal switches 505,506. However, in some embodiments, the domed metal switches can be electrically isolated from each other. Each domed metal switch has an electrical conductor disposed under its dome. Illustrating by example, domed metal switch 504 has an electrical conductor disposed beneath the portion of the domed metal switch that is exposed through its corresponding liquid impermeable layer 508.

Figure 6:
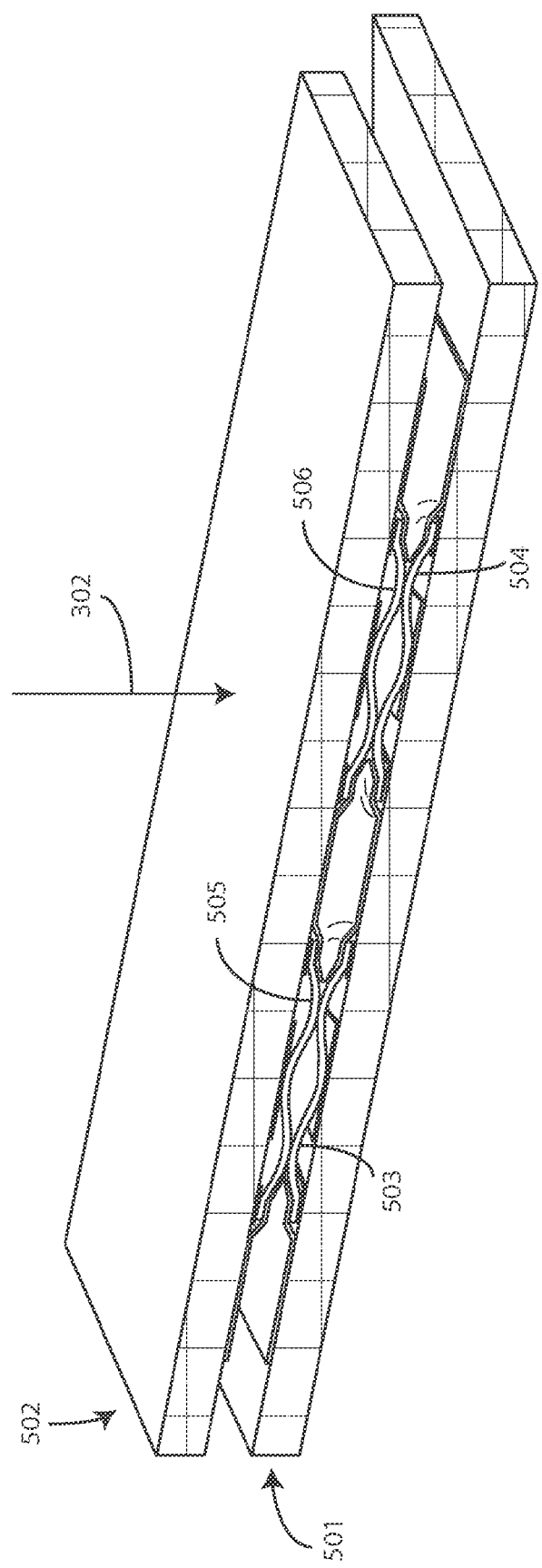
FIG. 6 illustrates another explanatory electrical connector system, in an engaged state, configured in accordance with one or more embodiments of the invention.

In this illustrative embodiment, the operation of the connector system 600 is largely the same as that described above with reference to FIG. 4. Turning now to FIG. 6, the first connector portion 501 is being pressed against a complementary second connector portion 502 by an applied force 302. The first domed metal switch 503 of the first connector portion 501 aligns with the corresponding domed metal switch 505 of the second connector portion 502. Similarly, the second domed metal switch 504 of the first connector portion 501 aligns with its corresponding domed metal switch 506 of the second connector portion 502. The complementary domed metal switches then deform a corresponding domed metal switch when the connector portions 501,502 are pressed together. For example, as shown in FIG. 6, domed metal switch 503 of the first connector portion 501 deforms domed metal switch 505 of the second connector portion 502 in response to the applied force 302. Similarly, domed metal switch 504 of the first connector portion 501 deforms domed metal switch 506 of the second connector portion 502. When this occurs, the domed metal switches 503,504,505,506 deform sufficiently to contact the electrical conductors disposed beneath their domes. This facilitates an electrical connection between the connector portions 501,502 through their domed metal switches 503,504,505,506, thereby providing an electrical connection without compromising the waterproof integrity of either connector portion 501,502.

Figure 7:
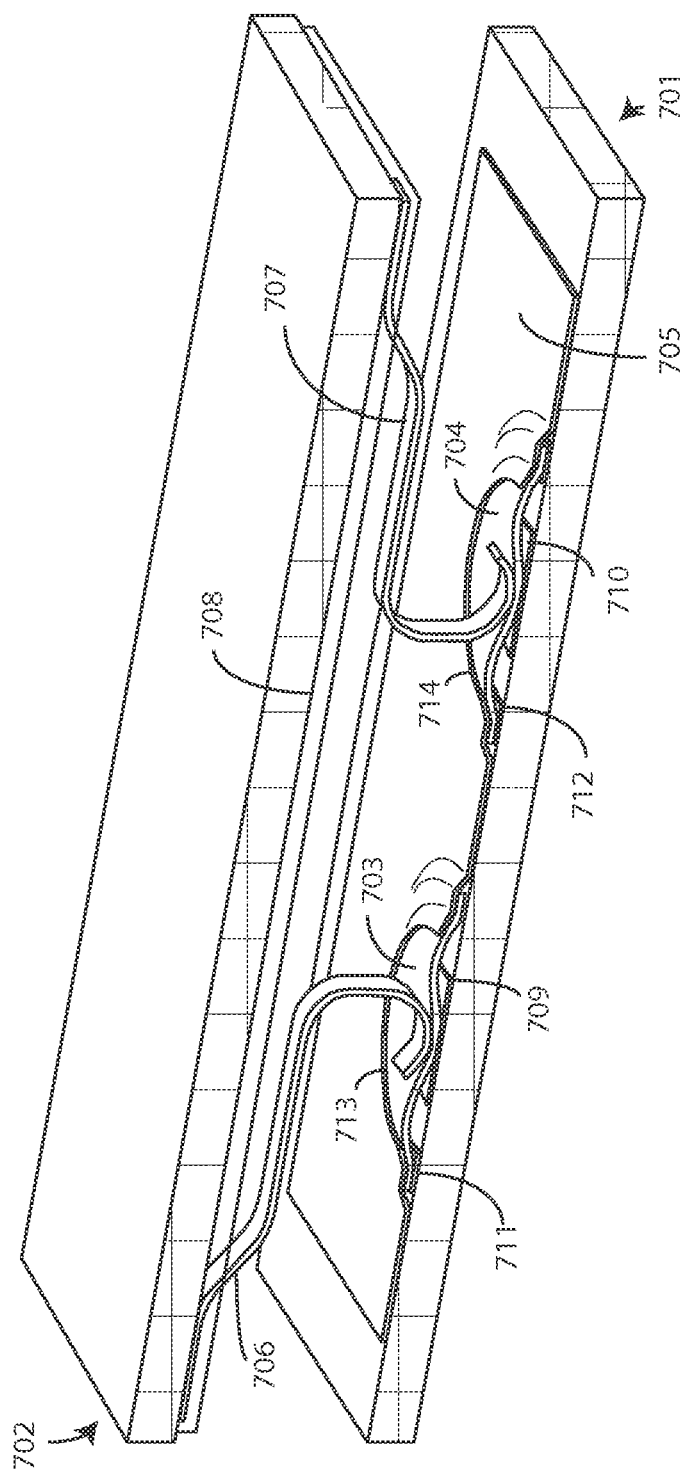
FIG. 7 illustrates yet another explanatory electrical connector system configured in accordance with one or more embodiments of the invention.

Domed metal switches are but one example of an actuation element that can be substituted for the actuation protrusion (107) described above. Turning now to FIG. 7, illustrated therein is yet another embodiment of a connector system 700 configured in accordance with one or more embodiments of the invention. In the illustrative embodiment of FIG. 7, a first connector portion 701 comprises two domed metal switches 703,704. Each domed metal switch 703,704 is partially covered with a liquid impermeable barrier 705 such that a portion of each domed metal switch 703,704 is exposed through the liquid impermeable barrier 705. As with previous embodiments, the liquid impermeable barrier 705 is coupled to the domed metal switches 703,704 with a liquid impermeable junction.

A complementary connector portion 702 comprises a pair of dome switch actuators 706,707. The dome switch actuators 706,707 are also partially covered with another liquid impermeable layer 708, with a liquid impermeable junction disposed at the base of each dome switch actuator 706,707. Note, however, that if the complementary connector portion 702 is not a waterproof device, the second liquid impermeable layer 708 can be omitted.

In the illustrative embodiment of FIG. 7, each dome switch actuator 706,707 comprises a leaf spring element. In this embodiment, the leaf spring elements are made from spring steel and are formed into curvilinear segments operable to deform the domed metal switches 703,704 in response to an applied force. As shown in FIG. 7, when this occurs, the domed metal switches 703,704 touch electrical conductors 709,710 disposed beneath the domes, thereby creating an electrically conductive path between electrical conductors 711,712 coupled to the perimeters 713,714 of the domed metal switches 703,704 and the electrical conductors 709, 710. Of course, when the dome switch actuators 706,707 are electrically conductive as well, voltage and current can be conducted between the electrical conductors 709,710 and the dome switch actuators 706,707 through the domed metal switches 703,704.

The inventors of embodiments set forth in this disclosure appreciate that the connectors described herein are suitable for connecting to complementary conductors to form a connector system in a variety of ways. For instance, connector systems described above have been formed when an applied force (302) presses two complementary connectors together. However, there are other methods of interfacing to which embodiments of the present invention are also well suited. One such method is sliding. Connectors configured in accordance with embodiments of the invention can be slid laterally across each other to form a reliable electrical connection. Additionally, connectors configured in accordance with embodiments of the invention can be twisted together.

Figure 8:
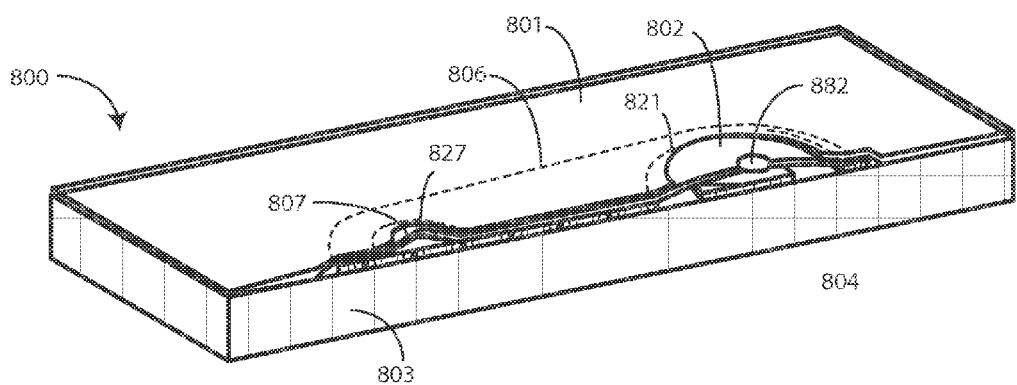
FIG. 8 illustrates an alternate electrical connector configured in accordance with one or more embodiments of the invention.
Figure 9:
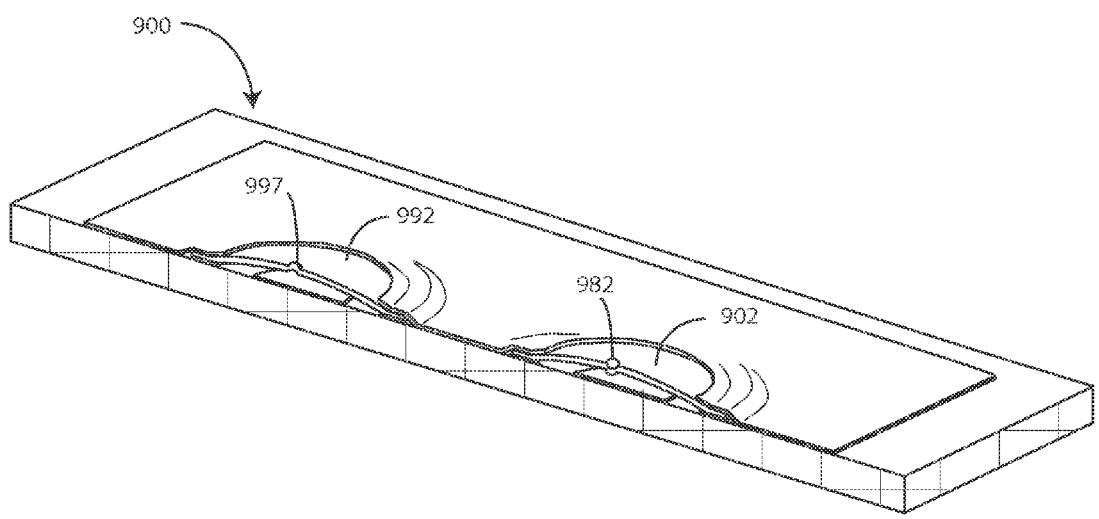
FIG. 9 illustrates yet another alternate electrical connector configured in accordance with one or more embodiments of the invention.

When sliding or twisting connectors together, additional features can be incorporated into the connectors to make the coupling process more efficient. Two features worthy of note are the inclusion of actuator protrusions and recesses on the domed switch actuators and configuring compliance into the dome switch actuators. Turning now to FIGS. 8 and 9, these explanatory features will be described in more detail.

Beginning with FIG. 8, illustrated therein is a connector 800 in which the domed metal switch 802 comprises a recess 882 and the actuation protrusion 807 comprises compliance. As with previous embodiments, the connector 800 of FIG. 8 includes a domed metal switch 802 that is partially covered with a liquid impermeable barrier 801 such that a portion of the domed metal switch 802 is exposed through the liquid impermeable barrier 801. The domed metal switch 802 interfaces with the liquid impermeable barrier 801 at a liquid impermeable junction 821.

An actuation protrusion 807 is configured as the dome switch actuator in this illustrative embodiment. The actuation protrusion 807 is electrically and physically coupled to the domed metal switch 802 by a flange 806. A vertex 827 of the actuation protrusion is exposed through the liquid impermeable layer 801.

Since the connector 800 can be coupled to a complementary connector by sliding in one embodiment, the domed metal switch 802 includes a recess 882 into which the actuation protrusion 807 can seat when the connector 800 is properly aligned with the complementary connector. In effect, the recess 882 serves as a mechanical catch indicating that the dome switch actuator formed by the complementary actuation protrusion is properly aligned with the domed metal switch 802. The recess 882 can further work to reduce the distance by which the domed metal switch 802 must deform to touch the electrical conductor 804 disposed beneath the dome.

To facilitate easier sliding, in this illustrative embodiment the actuation protrusion 807 is also configured with compliance. The compliance can be formed by contouring the actuation protrusion 807 so that it can slightly deflect relative to the substrate 803 when sliding against a complementary connector. For example, in one embodiment the sides of the actuation protrusion 807 can be curved such that portions of the actuation protrusion 807 may deform in the same way the domed metal switch 802 deforms. Incorporating compliance into the actuation protrusion—or other dome actuation element—simply makes a sliding or twisting engagement operation simpler.

Turning now to FIG. 9, illustrated therein is a connector 900 that includes two domed metal switches 902,992. Accordingly, each domed metal switch 902,992 serves both as a switch and as a dome switch actuator. Each domed metal switch 902,992 is already compliant, so no additional compliance is necessary. However, to provide the alignment advantage offered by the vertex (827) and recess (882) of the connector (800) of FIG. 8, the domed metal switches 902,992 of FIG. 9 have been configured with additional mechanical features. Specifically, one of the domed metal switches, domed metal switch 992 in this case, defines an actuator protrusion 997 extending distally therefrom. The other domed metal switch 902 defines a recess 982 that is complementary to the actuator protrusion 997. Consequently, when the connector 900 is slid against a complementary connector, the actuator protrusion 997 can engage a complementary recess while the recess 982 engages a complementary actuator protrusion, thereby indicating that the connector 900 and the complementary connector are properly aligned. Thus, when the actuator protrusion 997 is placed against a complementary recess and the recess 982 is placed against a complementary actuator protrusion, and the connector 900 is pressed against the complementary connector, a reliable electrical connection will be established.

As alluded to above, connectors configured in accordance with one or more embodiments of the invention are well suited both for use as user input devices and for connecting electrical devices together. To illustrate this dual functionality by example, FIGS. 10-14 will illustrated this using a wearable electronic device as an explanatory application.

Figure 10:
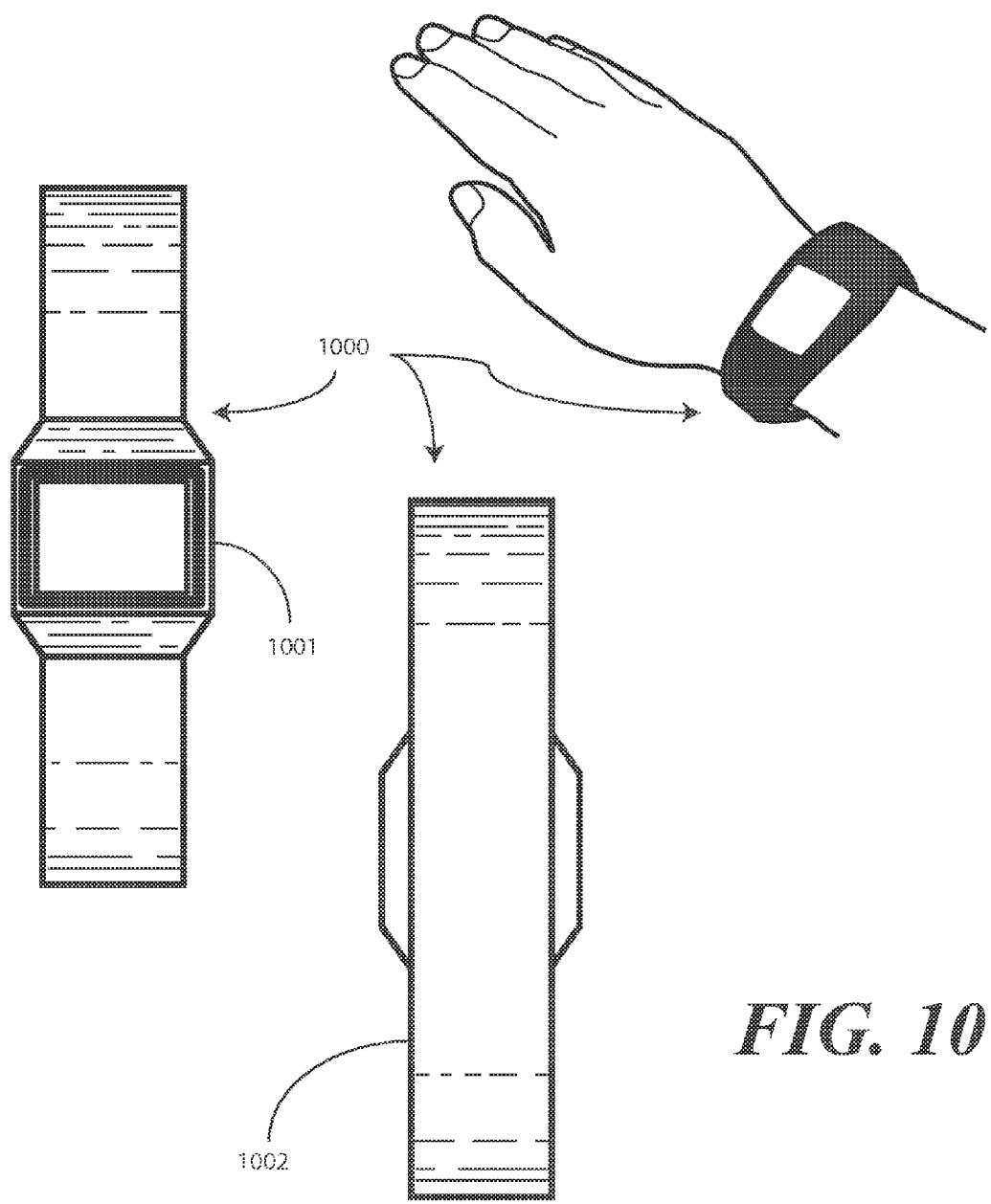
FIGS. 10-12 illustrate one explanatory electronic device suitable for use with one or more electrical connectors configured in accordance with one or more embodiments of the invention.

Turning first to FIG. 10, illustrated therein is one embodiment of a wearable electronic device 1000 suitable for use with connectors configured in accordance with embodiments of the invention. While a wearable device is being used for explanatory purposes, it will be clear to those of ordinary skill in the art that other electronic devices are equally suited to employing the connectors described herein. The wearable electronic device 1000 of FIG. 10 is described in more detail in commonly assigned, copending U.S. patent application Ser. No. 13/297,662, entitled, "Display Device, Corresponding Systems, and Methods Therefor," which is incorporated herein by reference for all purposes.

The wearable electronic device 1000 includes a detachable electronic module 1001 and an active strap 1002. Each of these devices includes electrical components, and connectors configured in accordance with embodiments of the present invention can be used to facilitate an electrical connection between the two. For example, in a simple embodiment, the active strap 1002 may include a power source, such as a flexible battery, while the detachable electronic module 1001 serves as the nerve center of the wearable electronic device 1000 by including the circuits, controllers, executable code, and user interfaces. In such an embodiment, connectors configured as described above can be used to deliver power from the active strap 1002 to the detachable electronic module 1001. In other embodiments, both the active strap 1002 and the detachable electronic module 1001 can include circuit components and power sources such that each can be used as a stand-alone device. In this embodiment, connectors configured as described above can be used to for data communication between the respective devices so that the active strap 1002 and detachable electronic module 1001 can work together as an integrated device.

Figure 11:
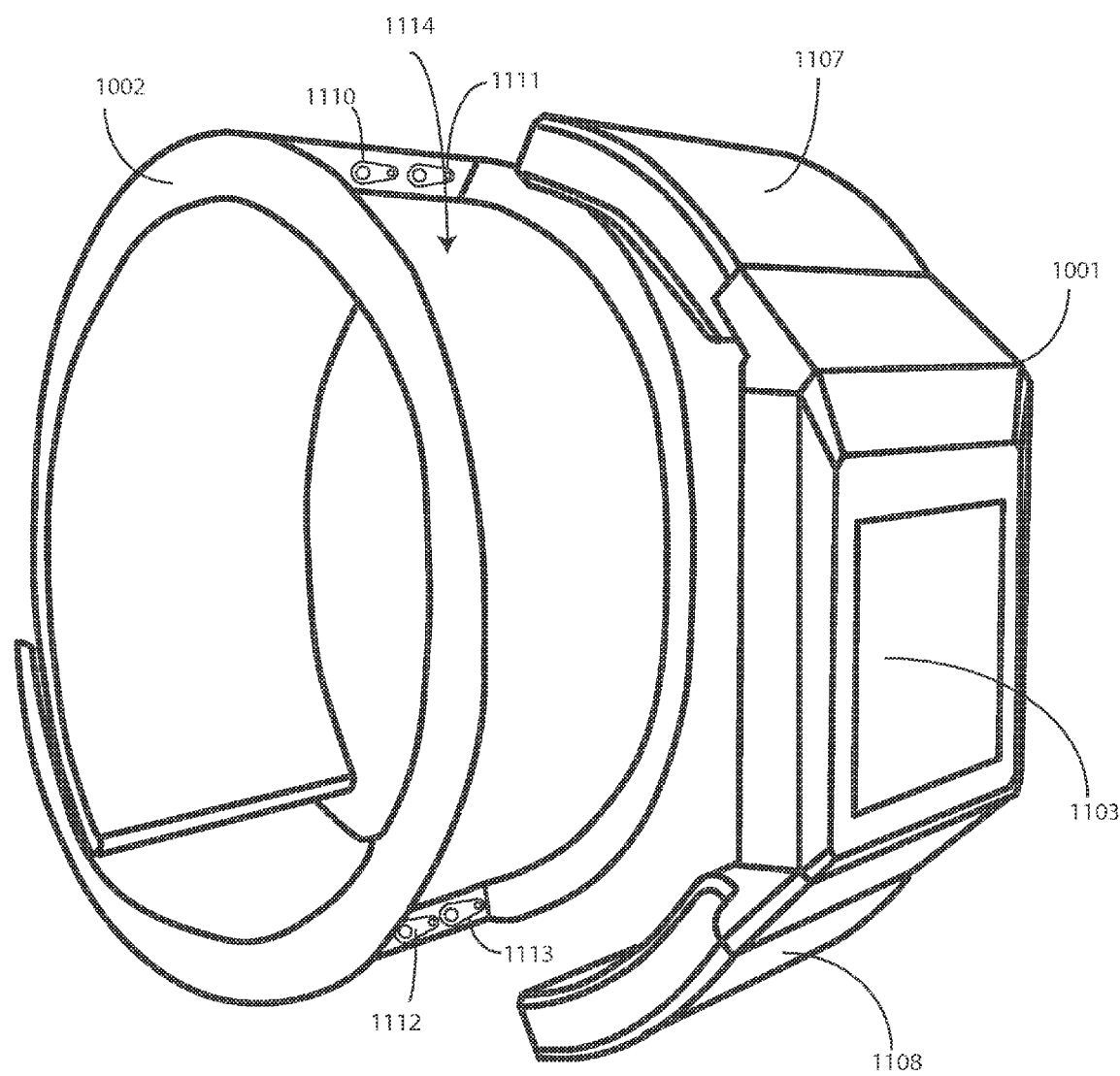

As shown in FIG. 11, in one embodiment the detachable electronic module 1001 can be configured so as to be selectively detachable from the active strap 1002. Accordingly, the detachable electronic module 1001 can be used as a stand-alone electronic device. For example, in one embodiment the detachable electronic module 1001 can be configured with cellular communication capabilities and may be detached from the active strap 1002 to be used more privately as a mobile telephone than if it were coupled to a wearer's wrist. In other embodiments, the active strap 1002 can optionally be configured with mechanically configurable characteristics such that it can be used as a mechanically configurable stand when the wearable electronic device 1000 is placed on a table. As noted above, in one embodiment both the active strap 1002 and the detachable electronic module 1001 can be configured as "active" devices. An active device refers to a device that includes a power source and hardware. Active devices can include control circuits or processors as well.

In one or more embodiments, the detachable electronic module 1001 can be detached from the active strap 1002 so that it can be coupled with, or can communicate or interface with, other devices. Connectors configured in accordance with embodiments of the present invention can be used for this purpose. For example, where the detachable electronic module 1001 includes wide area network communication capabilities, such as cellular communication capabilities, the detachable electronic module 1001 may be coupled to a folio or docking device using connectors configured in accordance with embodiments of the present invention to interface with a tablet-style computer. In this configuration, the detachable electronic module 1001 can be configured to function as a modem or communication device for the tablet-style computer. In such an application, a user may leverage the large screen of the tablet-style computer with the computing functionality of the detachable electronic module 1001, thereby creating device-to-device experiences for telephony, messaging, or other applications. The detachable nature of the detachable electronic module 1001, facilitated by connectors configured in accordance with embodiments of the present invention, serves to expand the number of experience horizons for the user.

In one embodiment the detachable electronic module 1001 includes a display 1103 configured to provide visual output to a user. The visual output can be text, pictures, video, audio, or other content. As will be shown in subsequent figures, in one or more embodiments, the wearable electronic device 1000 can be configured with various combinations of the following features: wide area network communication capabilities, e.g., cellular or other mobile communication capabilities; local area network communication capabilities, e.g., Bluetooth™ or other similar communication capabilities; voice call capabilities including conventional phone functionality, speaker phone functionality, or private mode capabilities via a wired or wireless headset; one or more wellness sensors, such as heart rate sensors, temperature sensors, or sweat sensors; context sensors, such as accelerometers, global positioning sensors, microphones, local infrared sensors, local light sensors, and local touch sensors; and other safety and security sensors and applications. These features can be integrated into the detachable electronic module 1001, the active strap 1002, or by way of a combination of the two when coupling the detachable electronic module 1001 to the active strap 1002 using connectors configured in accordance with embodiments of the present invention.

The detachable electronic module 1001, in one embodiment, is equipped with a first detachable electronic module extension 1107 and a second detachable electronic module extension 1108. The detachable electronic module extensions 1107,1108 can be coupled to the housing of the detachable electronic module 1001 by way of hinge. Accordingly, the first detachable electronic module extension 1107 can be hingedly coupled to a first side of the housing such that it extends distally from the first side of the housing, while the second electronic module extension 1108 can be hingedly coupled to a second side of the housing that different from the first side, such that it extends distally from the second side of the housing. The hinged attachment allows the first detachable electronic module extension 1107 and the second electronic module extension 1108 to selectively pivot from a closed position, where the detachable electronic module extensions 1107,1108 are disposed against a rear, major face of the housing, to an angularly displaced open position extending distally outward from the housing.

As shown in FIG. 11, the detachable electronic module 1001 connects, in this illustrative embodiment, to the active strap 1002 by way of one or more connectors 1110,1111, 1112,1113, each of which is configured as described above with reference to FIGS. 1-4 above. These connectors 1110, 1111,1112,1113 allow data and power to be transferred between the detachable electronic module 1001 and the active strap 1002 so that these devices can work in tandem. The attachment bay 1114 of the active strap includes the connectors 1110,1111,1112,1113 that mate with complementary connectors disposed on the detachable electronic module extensions 1107,1108 (which are not shown in FIG. 11). The location of these connectors 1110,1111,1112,1113 is illustrative only.

When the detachable electronic module 1001 is inserted into the attachment bay 1114, the dome switch actuators of each connector 1110,1111,1112,1113 of the active strap 1002 are configured to deform the domed metal switches of the complementary connectors disposed on the detachable electronic module extensions 1107,1108. Similarly, the dome switch actuators of the complementary connectors disposed on the detachable electronic module extensions 1107,1108 are configured to deform the domed metal switches of the connectors 1110,1111,1112,1113 of the active strap. This occurs when the actuation elements are placed against the portions of the domed metal switches that are exposed and the connectors 1110,1111,1112,1113 and complementary connectors are pressed together. The hinged connection between the detachable electronic module extensions 1107,1108 and the main body of the detachable electronic module 1001 can apply the necessary compression force to form the electrical connection. Using these connectors 1110,1111,1112,1113 allows both the detachable electronic module 1001 and the active strap 1002 to be configured as waterproof devices. The resulting assembly, i.e., the system created when the detachable electronic module 1001 is inserted into the attachment bay 1114, is also waterproof.

Figure 12:
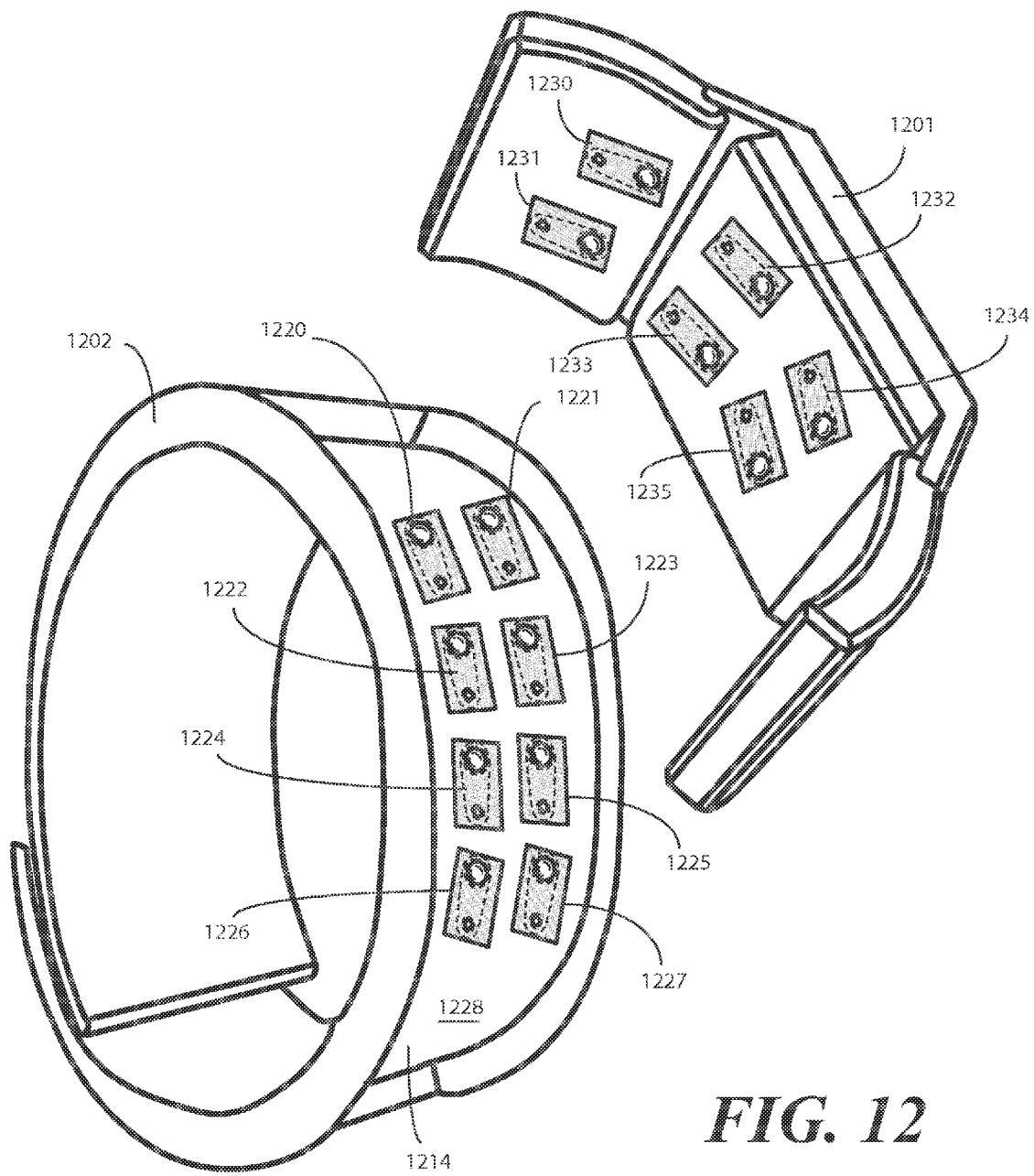

Turning now to FIG. 12, an alternate connector configuration is shown between a detachable wearable electronic device 1201 and an active strap 1202. The connector configuration of FIG. 11 was sleek in that the connectors (1110,1111, 1112,1113) were configured to be small and relatively hidden within the attachment bay (1114). By contrast, in FIG. 12, the connectors 1220,1221,1222,1223,1224,1225,1226,1227 are disposed along a major face 1228 of the attachment bay 1214. This configuration allows the connectors 1220,1221,1222, 1223,1224,1225,1226,1227 to be used both as user input devices and as a coupling mechanism for coupling voltage, current, and/or data signals between the active strap 1202 and the detachable wearable electronic device 1201.

The detachable electronic module 1201 has been rotated to reveal complementary connectors 1230,1231,1232,1233,1234,1235 disposed along a back face of the detachable electronic module 1201. When the detachable electronic module 1201 is inserted into the attachment bay 1214, the complementary connectors 1230,1231,1232, 1233,1234,1235 engage the connectors 1220,1221,1222,1223,1224,1225,1226,1227 to deform the corresponding domed metal switches as previously described.

When the detachable electronic module 1201 is detached from the active strap 1202, however, a user can use a finger, stylus, or other object to deform the domed metal switches of the connectors 1220,1221,1222,1223,1224,1225,1226,1227 to use the connectors 1220,1221,1222,1223,1224,1225,1226,1227 as a keypad. A control circuit operable with the connectors 1220,1221,1222, 1223,1224,1225,1226,1227 can be configured to determine whether the connectors 1220,1221,1222,1223,1224,1225,1226,1227 are being actuated by an electronic device, such as the detachable electronic module 1201, or by a user by determining whether voltage or current is being applied to the domed metal switches when deformed. Where voltage or current is being applied, the control circuit can be configured to determine that an electronic device has caused the deformation. Where there is no voltage or current being applied to the domed metal switches, the control circuit can be configured to determine that a user is applying input to the connectors 1220,1221,1222,1223, 1224,1225,1226,1227. Accordingly, the control circuit can set the operating mode of a device based upon this determination. Where no voltage or current is applied while the domed metal switches are deformed, the control circuit can configure the connectors 1220,1221,1222,1223,1224,1225, 1226,1227 as a keypad or other user input device. Where voltage or current is being applied to the connectors 1220, 1221,1222,1223,1224,1225,1226,1227 when deformed, the control circuit can configure the connectors 1220,1221,1222, 1223,1224,1225,1226,1227 as an input/output device for connecting to any of a number of devices, including chargers, the detachable electronic module 1201, USB devices, and so forth. The complementary connectors 1230,1231,1232,1233, 1234,1235 of the detachable electronic module 1201 can be used in the same manner.

Figure 13:
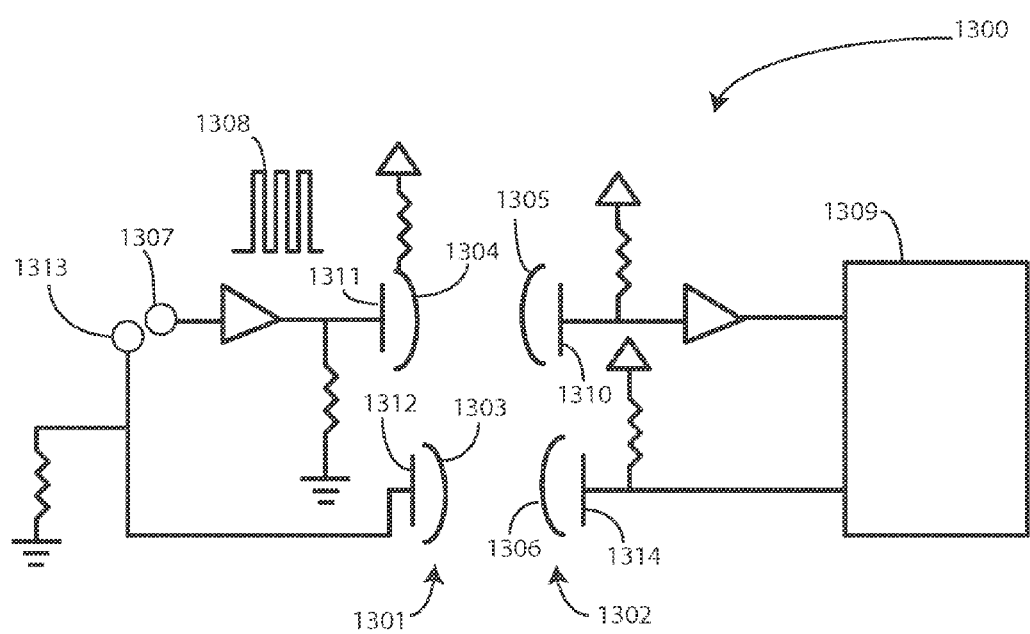
FIG. 13 illustrates a schematic diagram illustrating an explanatory electrical connector configured in accordance with one or more embodiments of the invention in operation.

Turning now to FIG. 13, illustrated therein is a schematic block diagram 1300 that will help to illustrate how this works. A first connector portion 1301 includes two domed metal switches 1303,1304. Similarly, a complementary, secondary connector portion 1302 includes two complementary domed metal switches 1305,1306. A voltage source 1307 is coupled to domed metal switch 1304 and is configured to deliver data via a time-varying digital voltage signal 1308 to the domed metal switch 1304.

A control circuit 1309 is coupled to the domed metal switches 1305,1306 of the second connector portion 1302. These domed metal switches 1305,1306 are configured to deform as previously described. The control circuit 1309 can be configured with executable code to execute a method for detecting input at the second connector portion 1302. Specifically, the control circuit 1309 can be configured to receive both user input and electronic device input at the second connector portion 1302 by determining whether one of a voltage or a current is applied to the domed metal switches 1305,1306 when they are deformed.

In a first example, presume that a user is pressing domed metal switch 1305 with a finger. The control circuit 1309 can detect this by determining that no current is flowing from the domed metal switch 1305 into an electrical conductor 1310 touched by the domed metal switch 1305 when deformed. Accordingly, each time the domed metal switch 1305 deforms to touch the electrical conductor 1310, the control circuit 1309 can interpret this action as user input. Examples of user input include key presses, power actuation, and so forth.

In another example, presume that domed metal switch 1304 engages and deforms domed metal switch 1305. When this occurs, the voltage source 1307 applies the time-varying digital voltage signal 1308 to the electrical conductor 1311 disposed beneath domed metal switch 1304. Both domed metal switch 1304 and domed metal switch 1305 deform as shown in FIG. 6 above. The time-varying digital voltage signal 1308 is thus delivered to electrical conductor 1310 through both domed metal switches 1304,1305. The control circuit 1309 detects this time-varying digital voltage signal 1308 and determines that an electronic device is coupled to the second connector portion 1302. Accordingly, the control circuit 1309 can configure connector portions coupled to it to receive voltage, current, data or other information from the connected electronic device.

Using charging as an example, presume that the electrical conductor 1312 disposed beneath domed metal switch 1303 is coupled to a charging voltage 1313. When the first connector portion 1301 is pressed against the second connector portion 1302, the control circuit 1309 will detect the time-varying digital voltage signal 1308 through electrical conductor 1310 as previously described. The control circuit 1309 can then configure the electrical conductor 1314 disposed beneath domed switch 1306 to receive charging current from the charging voltage 1313 through domed metal switches 1303,1306. When the time-varying digital voltage signal 1308 is removed from electrical conductor 1310, the control circuit can configure both electrical conductor 1310 and electrical conductor 1314 to again receive user input.

Figure 14:
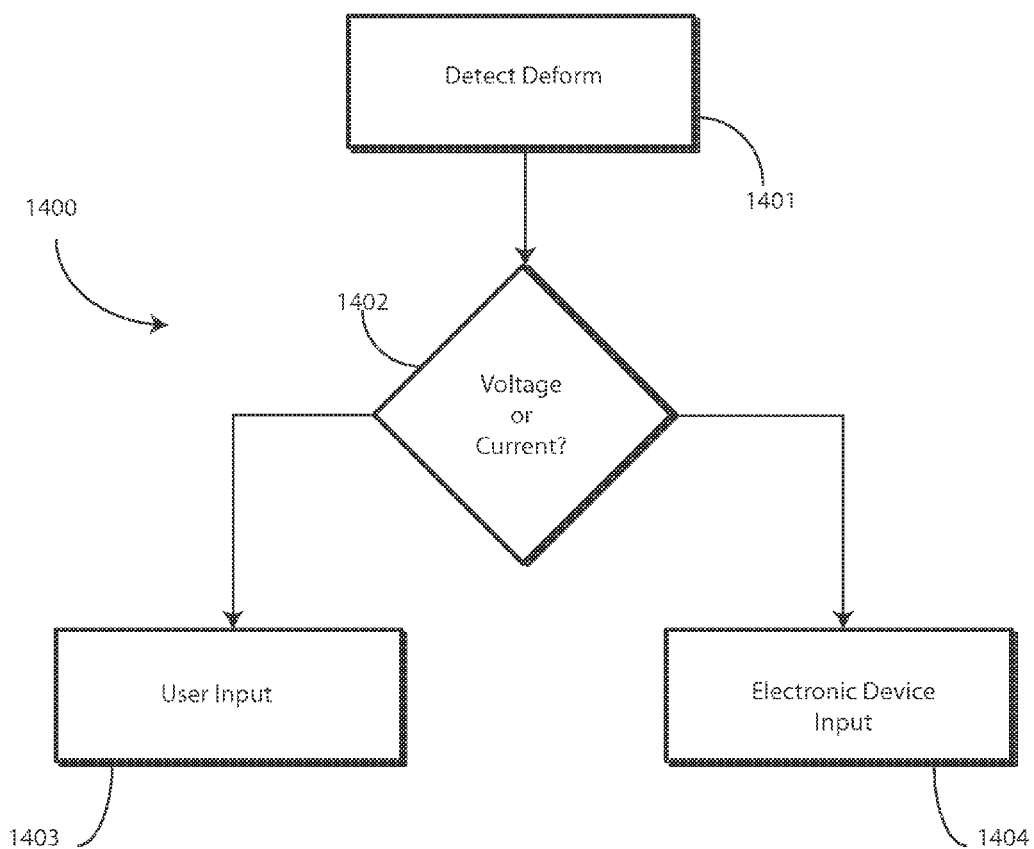
FIG. 14 illustrates one explanatory method of using an electrical connector configured in accordance with one or more embodiments of the invention.

Turning now to FIG. 14, this method 1400 of receiving input in an electronic device, using a control circuit, is shown in flow chart form. At step 1401, the method 1400 detects deformation of a domed metal switch. In one embodiment, the domed metal switch is partially covered with a liquid impermeable barrier such that an electrically conductive portion of the domed metal switch is exposed.

At decision 1402, the method 1400 determines whether one of a voltage or a current is being applied to the domed metal switch while it is deformed. Where it is, the method 1400 receives data, power, voltage, or current from another electronic device through the domed metal switch at step 1403. This step 1403 can also include delivering data, power, voltage, or current to the other electronic device as well. In one embodiment, this is delivered through a dome switch actuator. Where it is not, the method 1400 receives user input through the domed metal switch at step 1404.

As described, embodiments of the invention provide a connector that includes a domed metal switch, partially covered with a liquid impermeable barrier such that a portion of the domed metal switch is exposed. The liquid impermeable barrier is coupled to the domed metal switch with a liquid impermeable junction. An electrical conductor can be disposed beneath the domed metal switch and the liquid impermeable barrier, with at least some of a perimeter of the domed metal switch being electrically coupled to the electrical conductor. Another electrical conductor can be disposed beneath the domed metal switch and the liquid impermeable barrier as well. When the domed metal switch deforms, such as in response to an applied force, to touch the second electrical conductor, an electrically conductive path is created between the electrical conductors through the domed metal switch. The assembly can be constructed on a rigid substrate, such as an electronic device housing or a printed circuit board. A control circuit, operable with the connector, can be configured to detect one of voltage or current applied to the domed metal switch when deformed so as to determine whether input is from an electronic device or a user.

In one embodiment, a flange can extend from the domed metal switch. An actuation protrusion can extend distally from the flange. The actuation protrusion can be configured to be compliant. The liquid impermeable barrier can partially cover the actuation protrusion such that a vertex of the actuation protrusion is exposed. The liquid impermeable barrier can be coupled to the actuation protrusion with another liquid impermeable junction.

Connectors described herein can be used in a connector system. Specifically, a connector portion can comprise a domed metal switch partially covered with a liquid impermeable barrier such that a portion of the domed metal switch is exposed. A complementary connector portion can comprise a dome switch actuator partially covered with another liquid impermeable barrier such that the other liquid impermeable barrier partially covers the dome switch actuator such that an actuation element is exposed. The dome switch actuator can then deform the domed metal switch when the actuation element is placed against the portion of the domed metal switch and the connector portion and the complementary connector portion are pressed together. The dome switch actuator can comprise an actuator protrusion, another domed metal switch, a leaf spring, or other mechanical structure configured to deform the domed metal switch. Moreover, one of the domed metal switch or the another domed metal switch can define an actuator protrusion extending distally from the one of the domed metal switch or the another domed metal switch, while another of the domed metal switch or the another domed metal switch defines a recess that is complementary to the actuator protrusion.

One or more voltage sources can be coupled to the dome actuation elements. The voltage sources can be configured to deliver a voltage signal from the actuation element to the electrical conductor through the domed metal switch when deformed.

When incorporated into a waterproof device or devices, each device can stand-alone by itself while remaining waterproof. When two devices are joined by pressing, sliding, rotating, or "ski-booting," a dome switch actuator actuates a corresponding domed metal switch, thereby facilitating an electrical connection between the two devices. In some embodiments, rubber seals could seal liquids out of the connection, or in between the paired, deformed, domed metal switches to prevent shorting by the water.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A connector, comprising:
- a domed metal switch, partially covered with a liquid impermeable barrier such that a portion of the domed metal switch is exposed;
- a flange extending from the domed metal switch;
- an actuation protrusion extending distally from the flange;
- wherein:
  - the liquid impermeable barrier partially covers the actuation protrusion such that a vertex of the actuation protrusion is exposed; and
  - the liquid impermeable barrier is coupled to the actuation protrusion via another liquid impermeable junction; and
- wherein the liquid impermeable barrier is coupled to the domed metal switch with via a liquid impermeable junction.

2. The connector of claim 1, further comprising an electrical conductor disposed beneath the domed metal switch and the liquid impermeable barrier, wherein at least some of a perimeter of the domed metal switch is electrically coupled to the electrical conductor.

3. The connector of claim 2, further comprising another electrical conductor disposed beneath the domed metal switch and the liquid impermeable barrier, wherein the domed metal switch is configured to deform in response to an applied force to touch the another electrical conductor, thereby creating an electrically conductive path between the electrical conductor and the another electrical conductor through the domed metal switch.

4. The connector of claim 3, further comprising a rigid substrate, wherein the electrical conductor and the another electrical conductor are disposed on the rigid substrate, further wherein the liquid impermeable barrier comprises a flexible film.

5. The connector of claim 3, further comprising a control circuit operable with the connector to detect one of voltage or current applied to the domed metal switch when deformed.

6. The connector of claim 1, further comprising:
an electrical conductor disposed beneath the domed metal switch and the liquid impermeable barrier, at least some of a perimeter of the domed metal switch and the actuation protrusion electrically coupled to the electrical conductor; and
another electrical conductor disposed beneath the domed metal switch and the liquid impermeable barrier;
wherein the domed metal switch is configured to deform in response to an applied force to touch the another electrical conductor, thereby creating an electrically conductive path between the electrical conductor and the another electrical conductor through the domed metal switch.

7. A connector system, comprising:
a connector portion, comprising:
a domed metal switch, partially covered with a liquid impermeable barrier such that a portion of the domed metal switch is exposed;
a flange extending from the domed metal switch;
an actuation protrusion extending distally from the flange;
wherein:
the liquid impermeable barrier partially covers the actuation protrusion such that a vertex of the actuation protrusion is exposed; and
the liquid impermeable barrier is coupled to the actuation protrusion via another liquid impermeable junction; and
wherein the liquid impermeable barrier is coupled to the domed metal switch via a liquid impermeable junction; and
a complementary connector portion, comprising:
a dome switch actuator, partially covered with another liquid impermeable barrier such that the another liquid impermeable barrier partially covers the dome switch actuator such that an actuation element is exposed;
wherein the another liquid impermeable barrier is coupled to the dome switch actuator via another liquid impermeable junction.

8. The connector system of claim 7, wherein the dome switch actuator is configured to deform the domed metal switch when:
the actuation element is placed against the portion of the domed metal switch; and
the connector portion and the complementary connector portion are pressed together.

9. The connector system of claim 8, wherein the dome switch actuator comprises another domed metal switch.

10. The connector system of claim 9, wherein:
one of the domed metal switch or the another domed metal switch defines an actuator protrusion extending distally from the one of the domed metal switch or the another domed metal switch; and
another of the domed metal switch or the another domed metal switch defines a recess that is complementary to the actuator protrusion.

11. The connector system of claim 8, further comprising an electrical conductor disposed beneath the domed metal switch and the liquid impermeable barrier, wherein when the domed metal switch deforms, the portion of the domed metal switch is configured to contact the electrical conductor.

12. The connector system of claim 11, further comprising a voltage source coupled to the actuation element, configured to deliver a voltage signal from the actuation element to the electrical conductor through the domed metal switch when deformed.

13. The connector system of claim 7, wherein the dome switch actuator comprises a leaf spring element.

14. The connector system of claim 7, wherein the dome switch actuator comprises compliance, wherein the compliance is formed by contouring an actuation protrusion so that it can slightly deflect relative to a substrate when sliding against a complementary connector.

15. The connector system of claim 7, wherein:
the domed metal switch is electrically coupled to another dome switch actuator; and
the dome switch actuator is electrically coupled to another domed metal switch;
wherein:
the dome switch actuator is configured to deform the domed metal switch; and
the another dome switch actuator is configured to deform the another domed metal switch;
when:
the actuation element is placed against the portion of the domed metal switch;
another actuation element of the another dome switch actuator is placed against an exposed portion of the another domed metal switch; and
the connector portion and the complementary connector portion are pressed together.

* * * * *